(12) United States Patent
Contractor et al.

(10) Patent No.: US 6,427,001 B1
(45) Date of Patent: Jul. 30, 2002

(54) SYSTEM AND METHOD FOR NOTIFICATION OF 911 TELEPHONE CALLS USING A LINK MONITORING SYSTEM

(75) Inventors: Sunil H. Contractor, Marietta; Hong Nguyen, Atlanta, both of GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/874,998

(22) Filed: Jun. 7, 2001

(51) Int. Cl.[7] ............................................. H04M 11/04
(52) U.S. Cl. ..................... 379/45; 379/49; 379/221.08; 370/410
(58) Field of Search ........................ 379/37–51, 221.08, 379/221.09, 221.1, 221.12, 230; 370/352, 353, 354, 356, 410, 426; 455/410, 426

(56) References Cited

U.S. PATENT DOCUMENTS

| | | | |
|---|---|---|---|
| 5,195,126 A | 3/1993 | Carrier et al. | |
| 5,550,535 A | 8/1996 | Park | |
| 5,805,670 A * | 9/1998 | Pons et al. | 379/45 |
| 6,151,385 A * | 11/2000 | Reich et al. | 379/49 |
| 6,173,048 B1 | 1/2001 | Malik | |
| 6,201,856 B1 * | 3/2001 | Orwick et al. | 379/45 |

* cited by examiner

Primary Examiner—Melur Ramakrishnaiah
(74) Attorney, Agent, or Firm—Shaw Pittman LLP

(57) ABSTRACT

Notification of 911 telephone calls is provided to a telephone numbers listed on a pre-provided list of the telephone numbers without intrusion on the existing 911 infrastructure using the out-of-band SS7 signaling infrastructure. A link monitoring system (LMS) monitors SS7 messages to determine whether a 911 telephone call has been made. When the LMS determines that a 911 telephone call has been made, it sends a message containing calling party number information to a notification device. Using the telephone numbers provided on the notification list, the notification device notifies others that the 911 telephone call has been made.

33 Claims, 3 Drawing Sheets

SYSTEM AND METHOD FOR NOTIFICATION OF 911 TELEPHONE CALLS USING A LINK MONITORING SYSTEM

BACKGROUND

1. Field of Invention

The present invention relates generally to the field of telecommunication systems. More particularly the present invention relates to the field of notifying parties that a telephone call to 911 has been placed.

2. Background of the Invention

Telephone calls to 911 are generally routed to a public safety answering point (PSAP). The PSAP is a center containing 911 operators (or agents) who coordinate emergency services to respond to the 911 call. Generally, when a person places a 911 call, the call is routed through a central office (CO) through a tandem to the PSAP. An agent at the PSAP answers the call and provides whatever assistance is required to handle the emergency.

A database called an automatic location information (ALI) database is associated with the PSAP. The ALI database is generally part of a database management system having a database server through which the ALI database is queried. The ALI database contains records that associate telephone numbers with names and locations. When a call is made to 911, the PSAP queries the ALI database for location and name information. The query contains the telephone number associated with the telephone that made the 911 call. The ALI database passes the name and location information back to the PSAP in response to the query. This information can be made available to the agents in well-known ways.

There are often times when people would want to be notified that a 911 call has been made. For example, if a babysitter watching a child places an emergency telephone call to 911, that child's parent, other relative, neighbor and/or others might want to be notified of the 911 call. Generally, to provide such service, subscribers to a 911 notification service provide a list of telephone numbers to be called when any telephone associated with a particular telephone number dials 911 (notification list). When someone dials 911 from a phone associated with a phone number for which the service has been provisioned, all the telephone numbers in the notification list are notified of the telephone call. For example, in the case above, parents, friends or anyone else whose phone number is on the notification list can be notified of the 911 despite being located remotely from the telephone making the call, and not being co-located with one another.

One conventional system for 911 telephone call notification, provided by Lucent, makes use of the system control point (SCP) of the public-switched telephone system (PSTN). An office-wide trigger is established at the CO. The trigger activates when a telephone line served by the CO dials 911. The particular trigger used by Lucent is the NXX trigger. When someone that is served by the CO dials 911, the office-wide NXX trigger is activated. This causes the CO to suspend the call and send a query message to the SCP to determine how to process the call. The query message contains the subscriber's telephone number. The SCP extracts the subscriber's telephone number and sends a message back to the CO instructing the CO to complete the 911 call to the PSAP through the tandem.

Using the extracted subscriber's telephone number, the SCP then performs a database lookup to find the notification list provided by the subscriber containing the telephone numbers of those persons to notify of the 911 call. The SCP forwards this notification list to a service node (SN). As is well-known to those skilled in the art, the SN has outbound dialing capability. The SN dials each number on the list provided by the SCP to notify those persons on the list that the 911 call was made.

To get the notification list to the SCP database, Lucent sets up a web site that users can access through the Internet. Users can enter the information into a web page that is provided by the web site on a web server. The web server associated with the web site transmits this information to a services management system (SMS) associated with the PSTN. The SMS is a data distribution system that distributes data to SCPs in the PSTN. In this case, the SMS transfers the subscriber-entered notification list to the correct SCP, i.e., the SCP associated with the CO that homes the subscriber's telephone number.

There are several problems associated with the 911 notification system described above. For example, the SN is very expensive to use for outbound dialing purposes. Another significant disadvantage arises because of the use of the trigger. Processing the trigger adds from 100 milliseconds to 6 seconds to the time required to complete the call. Adding time to call completion is highly undesirable in the context of 911 calls, where seconds can save lives.

A second prior art system for 911 notification is provided in U.S. Pat. No. 6,151,385 to Reich et al ("Reich"). In Reich, there is no trigger set up. Rather, the CO completes the call to the PSAP through the tandem. In Reich, a patch is put into the ALI database server. When there is a query to the ALI database, a message is sent to an outbound dialing system or an operator that makes the outbound calls. The message contains the telephone number in the ALI query. As described above, this telephone number is the telephone number that is associated with the telephone that made the 911 call.

In Reich, there is a computer associated with the outbound dialing system or operator. This computer system receives the message from the ALI database. Using the phone number contained in the message, the computer system obtains a notification list of telephone numbers to call to notify other of the 911 call. The notification list is forwarded to the outbound dialing system, which dials the telephone numbers on the notification list to notify those on the list of the 911 call. Alternately, the notification list is forwarded to an operator who then places outbound calls to the telephone numbers on the list to make the notifications.

In Reich, subscribers create notification lists using the Internet to access a web site. Subscribers fill out a notification list form on a web page provided by the web site. The notification list is then stored on a web server associated with the web site or other file storage system associated with the web site.

Reich's system has the advantage of not delaying the 911 call as in the Lucent system described above. However, there are several disadvantages with the system described in Reich. One disadvantage is that Reich's system requires a change to the existing 911 infrastructure. That change is the patch that must be made for the ALI database server so that it sends a message containing the telephone number associated with the telephone making the 911 call to the computer system. Another disadvantage is that due to government regulations, telephone companies are not always free to send calling party name information (CPNI) to third party companies without consent. That is, for at least some numbers, regulations may prohibit a telephone company from sending the telephone number associated with the telephone making the 911 call to the computer system.

A third system for notifying other parties of 911 calls is described in U.S. Pat. No. 5,195,126 to Carrier et al ("Carrier"). Carrier describes a system for monitoring the voice telephone trunks between a central office and the tandem to see if a 911 call has been sent. Carrier describes using in-band signaling to determine whether a 911 call has been sent, i.e., Carrier analyzes the DTMF tones being sent to see if a 911 call has been placed.

As described in Carrier, a trunk monitoring device monitors one or more trunks on the output of the tandem for calls to 911. If a 911 call is detected using in-band signaling techniques, the monitoring device makes an outbound notification using a voice messaging system (VMS) that is available in the PSTN. The monitoring device obtains a notification list from a subscriber database.

A significant problem with this system is deciding which of the many trunks should be monitored. If not all trunks are monitored, then some 911 calls might be missed. Monitoring all of the trunks is a costly process, and requires constant updating as trunks are placed in and taken out of service. In addition, because the system teaches 911 call notification using the voice messaging system available in the PSTN to keep costs down, it foregoes some other notification paradigms that could have been used to notify parties on the notification list. Another problem associated with Carrier is that trunk line class codes may have to be changed to monitor the trunks between the central office and tandem. That is, the 911 infrastructure would have to be modified to implement Carrier.

Thus, what is required is a non-intrusive system and method for detecting that 911 calls have been placed, which does not have the complexity, inefficiency and cost associated with prior art trunk monitoring systems. In addition, the system should provide more flexible notification paradigms than are available in prior art notification systems.

SUMMARY OF THE INVENTION

The present invention solves the problems existing in the art by providing notification of 911 telephone calls to one or more telephone numbers on a pre-provided list of the telephone numbers without intruding on the existing 911 infrastructure, by using the out-of-band SS7 signaling infrastructure. A link monitoring system (LMS) monitors SS7 messages to determine whether a 911 telephone call has been made. When the LMS determines that a 911 telephone call has been made, it sends a message containing calling party number information to a notification device. The notification device uses contact information in the notification list to notify the parties designated in the notification list that the 911 telephone call has been made in accordance with a notification list.

In a preferred embodiment of the present invention, the LMS monitors an SS7 link between a central office and a tandem for the presence of 911 telephone calls. Specifically, the LMS is looking for an indication in called party number information that a 911 telephone call has been placed. If the LMS detects a 911 telephone call, it sends a message to a notification device over a computer network. The message includes calling party number information.

Using the calling party number information, the notification device performs a database lookup to find a notification list associated with the calling party number information. The database can be located locally or remotely with respect to the notification device. The notification device obtains the notification list associated with the calling party number information and contacts each party on the notification list to notify each party of the 911 telephone call. The notification can be by any of a number of technologies including, for example, telephone, pager, e-mail, facsimile or the Internet.

In the preferred embodiment of the present invention, the notification device and/or the LMS can determine whether a caller, associated with the calling party number information, is authorized to use the 911 notification service. In addition, in a preferred embodiment of the present invention, the notification device and/or the LMS can determine if a particular subscriber has given authorization to have his or her calling party name information sent to third parties.

Thus, one object of the present invention is to provide notification of 911 telephone calls without intruding on the existing 911 infrastructure.

Another object of the present invention it is to provide notification of 911 telephone calls in an efficient and less costly manner than available using conventional notification systems.

Another object of the present invention is to monitor the SS7 network to provide notification of 911 telephone calls.

Another object of the present invention is to provide notification of 911 telephone calls using various notification technologies.

These and other objects of the present invention are described in greater detail in the detailed description of the invention, the appended drawings and the attached claims.

DETAILED DESCRIPTION OF THE PREFERRED EMBODIMENTS

The present invention solves the problems existing in the art by providing notification of 911 telephone calls to contact devices on a pre-provided list of the contact devices without intruding on the existing 911 infrastructure by using the out-of-band SS7 signaling infrastructure. A link monitoring system (LMS) monitors SS7 messages to determine whether a 911 telephone call has been made. When the LMS determines that a 911 telephone call has been made, it sends a message containing calling party number information to a notification device. Optionally, the LMS determines if the calling party is a subscriber to the service prior to sending the message containing the calling party number information to the notification device. The notification device notifies others that the 911 telephone call has been made in accordance with a notification list.

Figure 1:
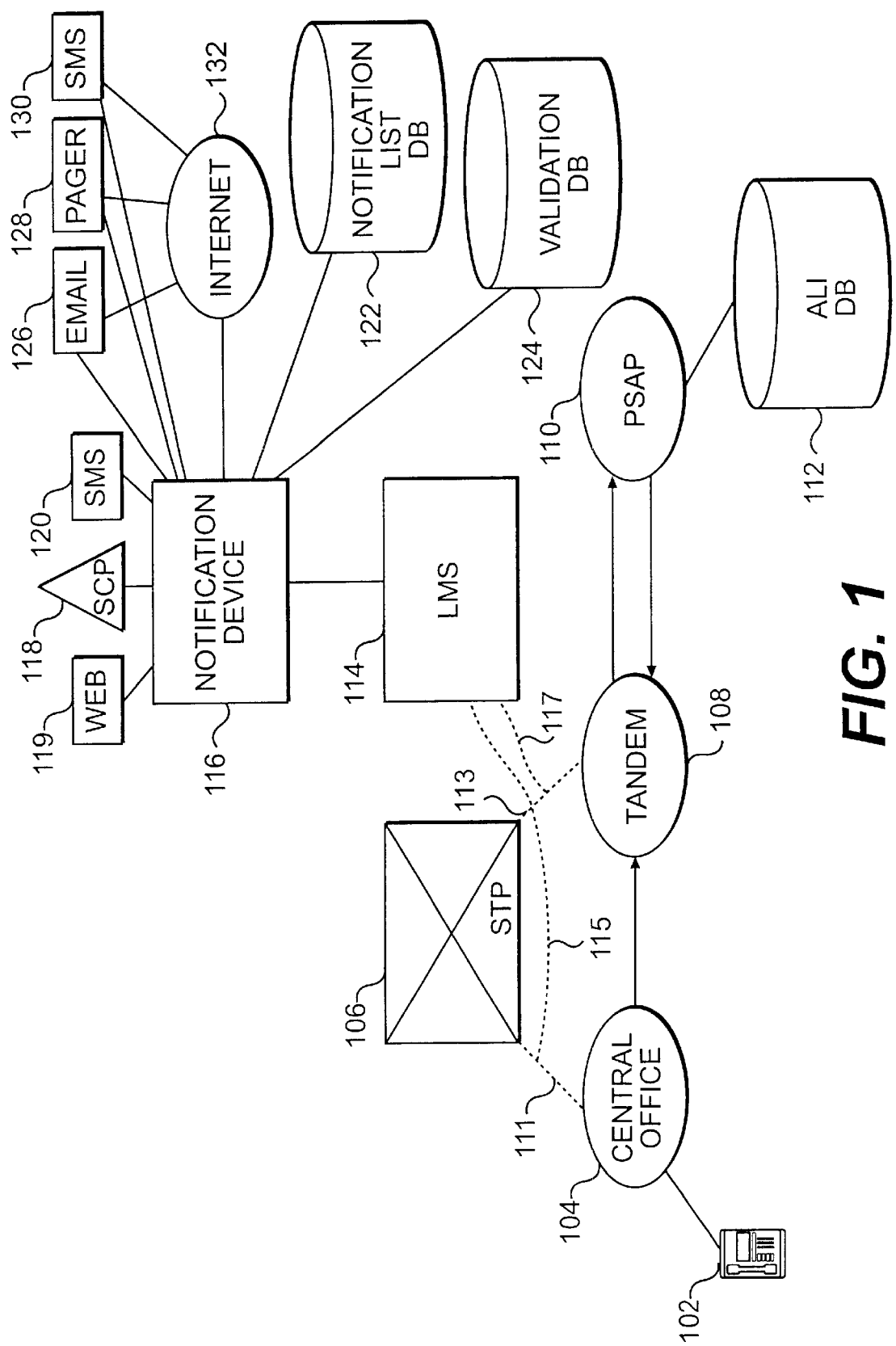
FIG. 1 is a schematic diagram of a system for providing notification of 911 telephone calls according to a preferred embodiment of the present invention.

FIG. 1 is a schematic illustration of a system for providing notification of 911 telephone calls according to a preferred embodiment of the present invention. A calling party using a telephone 102 having a telephone number associated therewith places a 911 call. The call is forwarded by a central office switch 104 to a tandem switch 108. Tandem switch 108 sends the 911 call (the terms "911 telephone call" and "911 call" are used interchangeably throughout this specification) to PSAP 110. PSAP 110 handles the telephone call using an ALI database 112 as described in the background section.

Before central office 104 sends the 911 call to tandem 108, there is out-of-band signaling that occurs between CO 104 and tandem 108 through STP 106. Through this signaling CO 104 and tandem 108 determine that end-to-end connectivity is possible before using trunk resources. This out-of-band signaling is known as common channel signaling system 7 or SS7. SS7 is well-known to those skilled in the art and is described only to the extent necessary to describe the present invention.

In the present context, to complete the 911 call, central office 104 and tandem 108 communicate in a well-known manner to set up a connection path to PSAP 110. They perform this negotiation by sending ISDN User Part (ISUP) messages to one another through a signaling transfer point (STP) 106. Messages between central office 104 and STP 106 are transmitted on link 111. Message between STP 106 and tandem 108 are transmitted on link 113.

A link monitoring system (LMS) 114 monitors communications on an SS7 link. LMS 114 is an SS7 monitoring system, such as is available from Agilent Technology. Any other monitoring system that can perform the function of LMS 114 described herein can be used. For purposes of the present application, the term "SS7 link" is used to refer to any of links 111, 113 or both, (including any intervening devices or circuitry such as STP 106) depending on implementation. It would be apparent to those skilled in the art that any monitoring of out-of-band signaling to detect 911 calls is within the scope and spirit of the present invention.

LMS 114 monitors the SS7 link in a passive manner. That is, it does not modify or otherwise interfere with any of the messages being transmitted over the SS7 link. For example, LMS 114 monitors an SS7 signaling message sent from CO 104 to STP 106 with its destination point code set to the point code of tandem 108. Its primary function is to look at the information contained in the messages. In the preferred embodiment, LMS 114 is coupled to links 111 and/or 113 via links 115 and 117 respectively.

Through links 115 and/or 117, LMS 114 obtains copies of all of the ISUP messages that are passed on the SS7 link to set up calls. Each of the ISUP messages contains calling party number information and called party number information, i.e., the dialed digits. Thus, the telephone number associated with the telephone making the call as well as the telephone number of the called party is contained in the ISUP messaging. According to the preferred embodiment of the present invention, LMS 114 is configured to look for messages in which the called party information indicates the call is a call to 911, for example, called party number is 911.

When a call is made, central office 104 negotiates with tandem 108 by sending ISUP messages across the SS7 link. LMS 114 analyzes each message on the SS7 link for called party number information. If the called party number information indicates that the call is not a 911 call, LMS 114 ignores the SS7 message for purposes of the present invention. In practice, it could log calls or take some other action, but those implementation details are not relevant to the present invention.

On the other hand, if the called party information indicates that the SS7 message is to set up a 911 call, LMS 114 sends a message to a notification device 116. Notification device 116 can be a service node (SN) or a computer telephony integration device (CTI) device, such as an outbound dialer or any other device that can provide notification according to the contact information in the notification list. Notification device 116 can also be a combination of devices to perform the notification functions described herein. CTI devices are preferred over SNs when the notification requires dialing because they are less expensive than SNs to provide the outbound dialing functionality required for the present invention. The CTI device can be any device capable of making a call or otherwise providing notifications according to the notification list. For example, the CTI device can be a personal computer (PC), predictive dialer system configured to carry out the functions described herein. An exemplary system for performing this function is EASE for Windows, available from EASE CT Solutions, a business unit of HBOC, Atlanta. In an alternate embodiment of the present invention, the notification can be performed by a human operator who provides notifications according to the notification list.

The message sent to notification device 116 contains calling party number information. The calling party number information includes the telephone number of the telephone 102 from which the calling party made the 911 call. Notification device 116 uses the calling party number information to perform a database lookup to obtain a notification list corresponding to the telephone number contained in the calling party number information. The database containing the notification list can be located locally or remotely with respect to notification device 116. When notification device 116 obtains the notification list, it dials each number on that list to notify the party associated with that telephone number that the 911 call has been placed.

The notification list is a pre-determined list contained contact information for parties that are to be notified when a 911 call is detected. The notification list can contain any information and names associated with those names. But at a minimum, the notification list must include the contact information. The contact information can be any contact information including for example, telephone numbers, facsimile numbers, pager number and/or addresses, personal assistant addresses, and/or e-mail addresses. These provide alternative methods for providing the notification.

When multiple types of contact information are provided in the notification list, it is preferable to also include a type indicator in a type field associated with each entry in the notification list. The type field is preferably used by notification device 116 to assist it in determining how to provide the notification of the 911 telephone call. For example, if the type field associated with a particular entry in the notification list indicates that entry is a telephone number, notification device 116 dials the telephone number in the notification list entry. If the type field associated with a particular entry in the notification list indicates that the entry is an e-mail address, notification device 116 sends an e-mail to the e-mail address provided in the entry to provide notification of the 911 telephone call.

It would be apparent to those skilled in the art that there are numerous ways that subscribers of the 911 call notification service described herein can provide a notification list. In a preferred embodiment, the user accesses a web site and creates the notification list is created using a graphical user interface (GUI). The GUI provides prompts in the form of various screens that prompt the subscriber to enter the contact information that is required for the notification list. Once the contact information is entered, the notification list is stored on a web server associated with the web site so that it can be accessed by the notification device when a 911 call is made from a telephone associated with the subscriber's telephone number. For example, the notification list can be stored on an Internet web site that provides a notification list service. The web server can be owned by the telephone company or by a third party notification list service. It would be apparent to those skilled in the art that there are many ways for a subscriber to create a notification list that can be accessed by notification device 116 within the scope and spirit of the present invention. Some of those ways are described in the Reich and Carrier patents, both of which are incorporated by reference herein in their entireties.

Notification device 116 can obtain the notification list using any of the methods described above. For example, as described above, notification device 116 can access a web server 119 on which a user has provided the notification list, can access an SCP 118 on which the notification list has been stored, can communicate with SMS 120 to obtain the notification list, or obtain the notification list from a local notification list database 122. Other mechanisms for obtaining notification lists would be known to those having skill in the art.

Notification device 116 can provide notifications via any communication paradigm. That is, it is not limited to notifications by making telephone calls. For example, notification device 116 can send an e-mail 126 to an e-mail address in the notification list, can send a page 128 to a pager number in the notification list, can send a fax to a facsimile number in the notification list, send a message 130 using the short messaging service (SMS), or any other kind of message to a variety of devices, including cellular telephones and pagers. The notification can be sent over the PSTN, Internet 132 or any other communication medium. In the preferred embodiment of the present invention, the user-entered notification list contains a field associated with each entry to indicate the kind of communication, whether it be a telephone number, a pager number, an e-mail address, or a facsimile number. In an alternate embodiment, notification device 116 can attempt to determine the communication type on its own. For example, the presence of an "@" sign can indicate that the communication is an e-mail or page.

In the preferred embodiment of the present invention, subscribers are authorized prior to the notification being made. To perform the notification, notification device 116 queries a validation and authorization database 124 using the calling party number information contained in the message sent from LMS 114. If the calling party number information corresponds to a valid subscriber, notification device 116 is authorized to proceed with the notification. Otherwise, notification device 116 does not continue with the notification.

In an alternative preferred embodiment of the present invention, LMS 114 determines if the calling party is a subscriber to the notification service prior to sending the message to notification device 116. In the alternate embodiment, LMS 114 queries a database to determine whether the caller is a subscriber to the 911 notification service of the present invention. The database that LMS 114 queries can be database 124. If LMS 114 determines that the caller is a subscriber to the 911 notification service, LMS 114 forwards the message to notification device 116.

A second use of validation database 124 can be to store authorization data received from customers that have given permission to have calling party name/number information forwarded to third parties. Prior to sending any calling party name information to a third party service, validation database 124 is queried to determine if the customer has provided authorization to have the calling party name/number information forwarded. If no authorization is provided, notification device 116 does not obtain a notification list, and it stops processing the call. This feature of the present invention is not required where no calling party number information is sent to a third party.

The present invention also allows the calling party name information (CPNI) to be provided to third party notification service providers. In this case notification device 116 can be a CTI platform not owned by the telephone company. For example, notification device 116 can be a third party notification service provider. When a 911 call is made, LMS 114 sends the message, containing calling party number information to the third party. Using the calling party number information contained in the message sent by LMS 114, the third party performs a database lookup to obtain the notification list associated with the telephone number in the calling party number information. The third party notification service provider then notifies the parties on the notification list using the contact information provided on the notification list.

The calling party information authorization database described above can be used. In this case, the validation database is preferably accessible to LMS 114. LMS 114 queries the validation database to determine if the subscriber has provided authorization to have his or her calling party number information forwarded to third parties. If the subscriber has not provided such authorization, LMS 114 does not send the message to notification device 116. However, if the subscriber has provided such authorization, LMS 114 forwards the message to notification device 116, i.e., to the third party, for processing.

Figure 2:
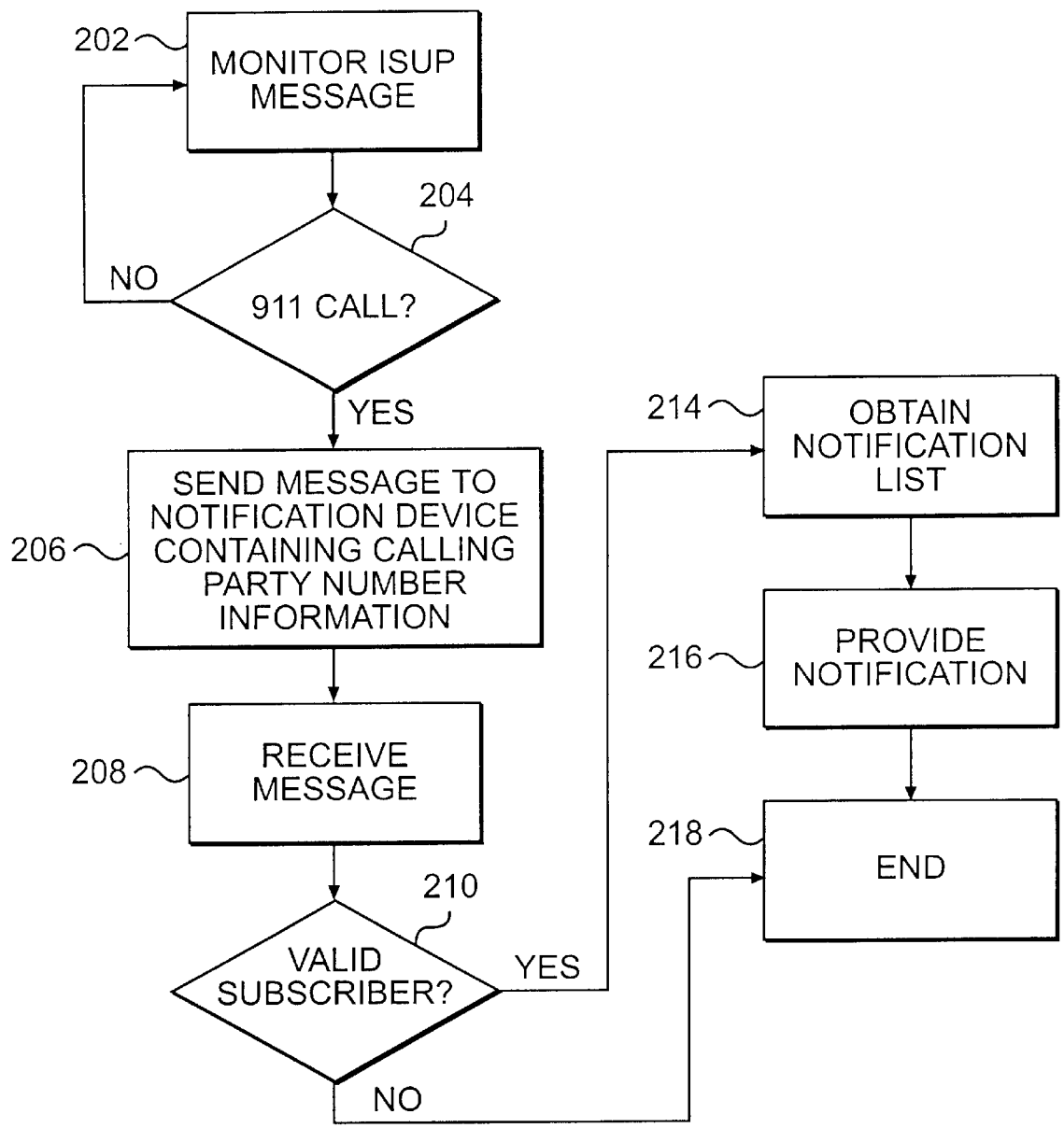
FIG. 2 is a flow chart for a method for providing notification of 911 telephone calls according to a preferred embodiment of the present invention.

FIG. 2 is a flow chart for a method according to the preferred embodiment of the present invention. In step 202, LMS 114 monitors an ISUP message. The ISUP message includes calling party number information and called party number information. In step 204, LMS 114 analyzes the called party number information to determine whether a 911 call has been placed. If no 911 call was placed, LMS 114 continues monitoring ISUP messages in step 202. If a 911 call was placed, LMS 114 goes to step 206, where it sends a message to notification device 116. The message includes the calling party number information, which contains the telephone number of the calling party.

Notification device 116 receives the message from LMS 114 in step 208. In step 210, notification device 116 determines if the calling party number information corresponds to a valid subscriber. If the calling party number information does not correspond to a valid subscriber, notification device 116 ends processing of the current call in step 218. If, on the other hand, the calling party number information corresponds to a valid subscriber, notification device 116 obtains the notification list corresponding to the telephone number contained in the calling party number information in step 214. It would be apparent to those skilled in the art that the notification list can be obtained prior to receiving authorization. Notification device 116 then notifies parties of the 911 call in accordance with the notification list in step 216. Notification device then ends processing of the current telephone call in step 218.

Figure 3:
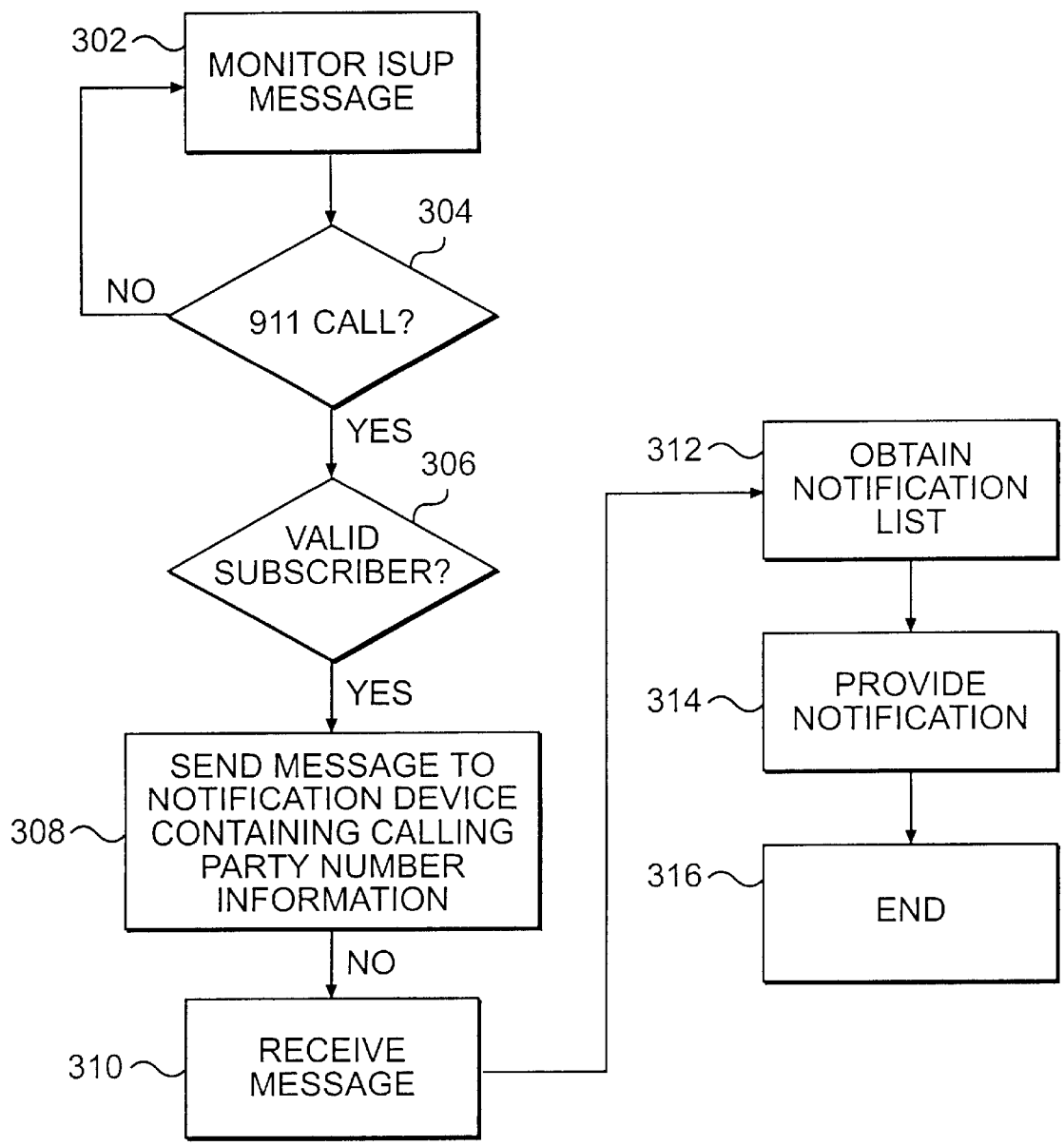
FIG. 3 is a flow chart for a method for providing notification of 911 telephone calls according to an alternative preferred embodiment of the present invention.

FIG. 3 is a flow chart for an alternative method according to the preferred embodiment of the present invention. In step 302, LMS 114 monitors an ISUP message. The ISUP message includes calling party number information and called party number information. In step 304, LMS 114 analyzes the called party number information to determine whether a 911 call has been placed. If no 911 call was placed, LMS 114 continues monitoring ISUP messages in step 302. If a 911 call was placed, LMS 114 continues in step 306 where it determines whether the calling party is a valid subscriber of the 911 notification service described herein. Preferably, LMS 114 queries a database containing subscriber validation information using calling party number information that is contained in the monitored SS7 signaling message associated with the 911 call. Such a database can be, for example, a database such as database 124. If the calling party is not a valid subscriber, LMS 114 continues monitoring SS7 signaling information in step 302. If the calling party is a valid subscriber, LMS 114 goes to step 308, where it sends a message to notification device 116. The message includes the calling party number information, which contains the telephone number of the calling party.

Notification device 116 receives the message from LMS 114 in step 310. In step 312, notification device 116 obtains the notification list corresponding to the telephone number contained in the calling party number information. It would be apparent to those skilled in the art that the notification list can be obtained prior to receiving authorization. Notification device 116 then notifies parties of the 911 call in accordance with the notification list in step 314. Notification device then ends processing of the current telephone call in step 316.

While the preferred embodiment of the present invention was described above in terms of the existing telephone system using SS7 signaling, the present invention is also applicable to other networks. For example, the present invention can be used in a voice-over-IP (VOIP) network. In a VOIP network, a monitoring device similar in function to LMS 114 can monitor VOIP signaling and or traffic non-intrusively to determine whether a 911 call has been placed. If a 911 call has been placed, the monitoring device can cause notification of the 911 call as described above.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A system for providing notification of 911 telephone calls, comprising:
    a central office that receives telephone calls and sends an ISUP message for each telephone call to a switch transfer point containing calling party number information and called party number information;
    a link monitoring system that monitors an SS7 link on which the ISUP messages are transmitted and determines from the called party number information whether a 911 telephone call has been made, and transmits an indication that the 911 telephone call has been made; and
    a notification device that receives the indication that the 911 telephone call has been made sent by the link monitoring system, retrieves a notification list of parties to notify that the 911 telephone call has been made, and provides notification of the 911 telephone call to the parties on the notification list.

2. The system recited in claim 1, wherein the notification device provides a notification using one or more of e-mail, facsimile, short messaging service and paging.

3. The system recited in claim 1, further comprising a validation database that the notification device uses to verify that the calling party number information is associated with a valid subscriber.

4. The system recited in claim 1, further comprising a notification list database from which the notification device can obtain the notification list.

5. The system recited in claim 4, wherein the notification list database is located remote to the notification device and the notification device accesses the notification list database over a computer network.

6. The system recited in claim 5, wherein the computer network is the Internet.

7. The system recited in claim 5, wherein the notification list database is owned by a third party, further comprising a database that the link monitoring system can access to determine whether a subscriber associated with the calling party number information has provided authorization for the calling party information to be provided to third parties.

8. A method for providing notification that a 911 telephone call has been made, comprising the steps of:
    monitoring an SS7 link for messages indicating the presence of a 911 call;
    sending a message containing calling party number information corresponding to a calling party that placed a 911 telephone call to a notification device, if a 911 telephone call is detected in one of the message;
    obtaining a notification list containing one or more parties to be notified of the 911 telephone call; and
    notifying each party on the notification list of the 911 telephone call.

9. The method recited in claim 8, further comprising the step of determining whether a person corresponding to the calling party number information is authorized to notify parties of the 911 telephone call.

10. The method recited in claim 8, wherein the notifying step comprises the step of notifying by using one or more of e-mail, facsimile, short messaging service and paging.

11. The method recited in claim 8, wherein the obtaining step further comprises the step of obtaining the notification list from a notification list database.

12. The method recited in claim 11, wherein the notification list database is located remote to the notification device, further comprising the step of accessing the notification list database over a computer network.

13. The method recited in claim 12, wherein the computer network is the Internet.

14. The method recited in claim 12, wherein the notification list database is owned by a third party, further comprising the step of determining whether a subscriber associated with the calling party number information has provided authorization for the calling party information to be provided to third parties.

15. A method for notifying a list of persons contained in a notification list that a 911 telephone call has been placed, comprising the steps of:
    creating the notification list;
    storing the notification list in a database;
    monitoring an SS7 link for messages indicating the presence of a 911 call;
    sending a message containing calling party number information corresponding to a calling party that placed a 911 telephone call to a notification device, if a 911 telephone call is detected in one of the message;
    obtaining the notification list from the database using the calling party number information; and
    notifying each party on the notification list of the 911 telephone call.

16. The method recited in claim 15, wherein the creating step comprises the step of using a graphical user interface to respond to one or more prompts to enter the notification list.

17. The method recited in claim 16, comprising the step of entering a communication type in the notification list for each party to be notified in the notification list.

18. The method recited in claim 15, further comprising the steps of:

storing the notification list in a database owned by a third party; and determining whether a subscriber associated with the calling party number information has provided authorization for the calling party information to be provided to third parties prior to performing the notifying step.

19. The method recited in claim 15, further comprising the step of determining whether the calling party number information corresponds to a person who subscribes to a 911 telephone call notification service.

20. A system for notifying one or more persons that a 911 telephone call has been placed, comprising:

means for monitoring an SS7 link for messages indicating the presence of a 911 call;

means for sending a message containing calling party number information corresponding to a calling party that placed a 911 telephone call to a notification device, if a 911 telephone call is detected in one of the message;

means for obtaining a notification list containing one or more parties to be notified of the 911 telephone call; and means for notifying each party on the notification list of the 911 telephone call.

21. The system recited in claim 20, further comprising the means for determining whether a person corresponding to the calling party number information is authorized to notify parties of the 911 telephone call.

22. The system recited in claim 20, wherein the means for notifying further comprises means for notifying by using one or more of e-mail, facsimile, short messaging service and paging.

23. The system recited in claim 20, wherein the means for obtaining further comprises means for obtaining the notification list from a notification list database.

24. The system recited in claim 23, wherein the notification list database is located remote to the notification device, further comprising means for accessing the notification list database over a computer network.

25. The system recited in claim 24, wherein the computer network is the Internet.

26. The system recited in claim 24, wherein the notification list database is owned by a third party, further comprising means for determining whether a subscriber associated with the calling party number information has provided authorization for the calling party information to be provided to third parties.

27. A system for providing notification of 911 telephone calls, comprising:

a link monitoring system that monitors an SS7 link on which ISUP messages are transmitted and determines from called party number information contained in the ISUP messages whether a 911 telephone call has been made, and transmits an indication that the 911 telephone call has been made; and a notification device that receives the indication that the 911 telephone call has been made sent by the link monitoring system, retrieves a notification list of parties to notify that the 911 telephone call has been made, and provides notification of the 911 telephone call to the parties on the notification list.

28. The system recited in claim 27, wherein the notification device provides a notification using one or more of e-mail, facsimile, short messaging service and paging.

29. The system recited in claim 27, further comprising a validation database that the notification device uses to verify that the calling party number information is associated with a valid subscriber.

30. The system recited in claim 27, further comprising a notification list database from which the notification device can obtain the notification list.

31. The system recited in claim 30, wherein the notification list database is located remote to the notification device and the notification device accesses the notification list database over a computer network.

32. The system recited in claim 31, wherein the computer network is the Internet.

33. The system recited in claim 31, wherein the notification list database is owned by a third party, further comprising a database that the link monitoring system can access to determine whether a subscriber associated with the calling party number information has provided authorization for the calling party information to be provided to third parties.

* * * * *